Nov. 8, 1938.    C. M. JAMESON    2,135,897
AUTOMATIC BRAKE DEVICE
Filed June 13, 1934    3 Sheets-Sheet 1
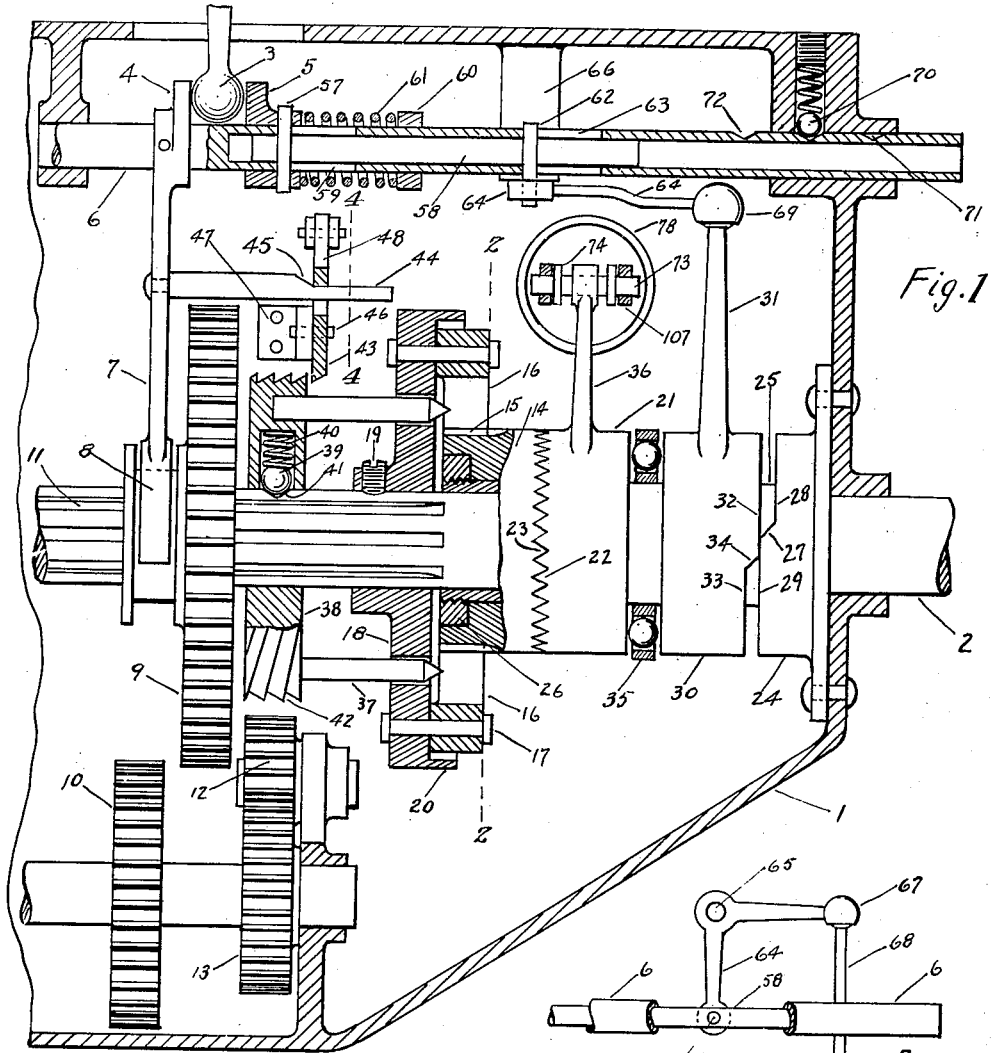
INVENTOR.
Charles M. Jameson Nov. 8, 1938.   C. M. JAMESON   2,135,897
AUTOMATIC BRAKE DEVICE
Filed June 13, 1934   3 Sheets-Sheet 2
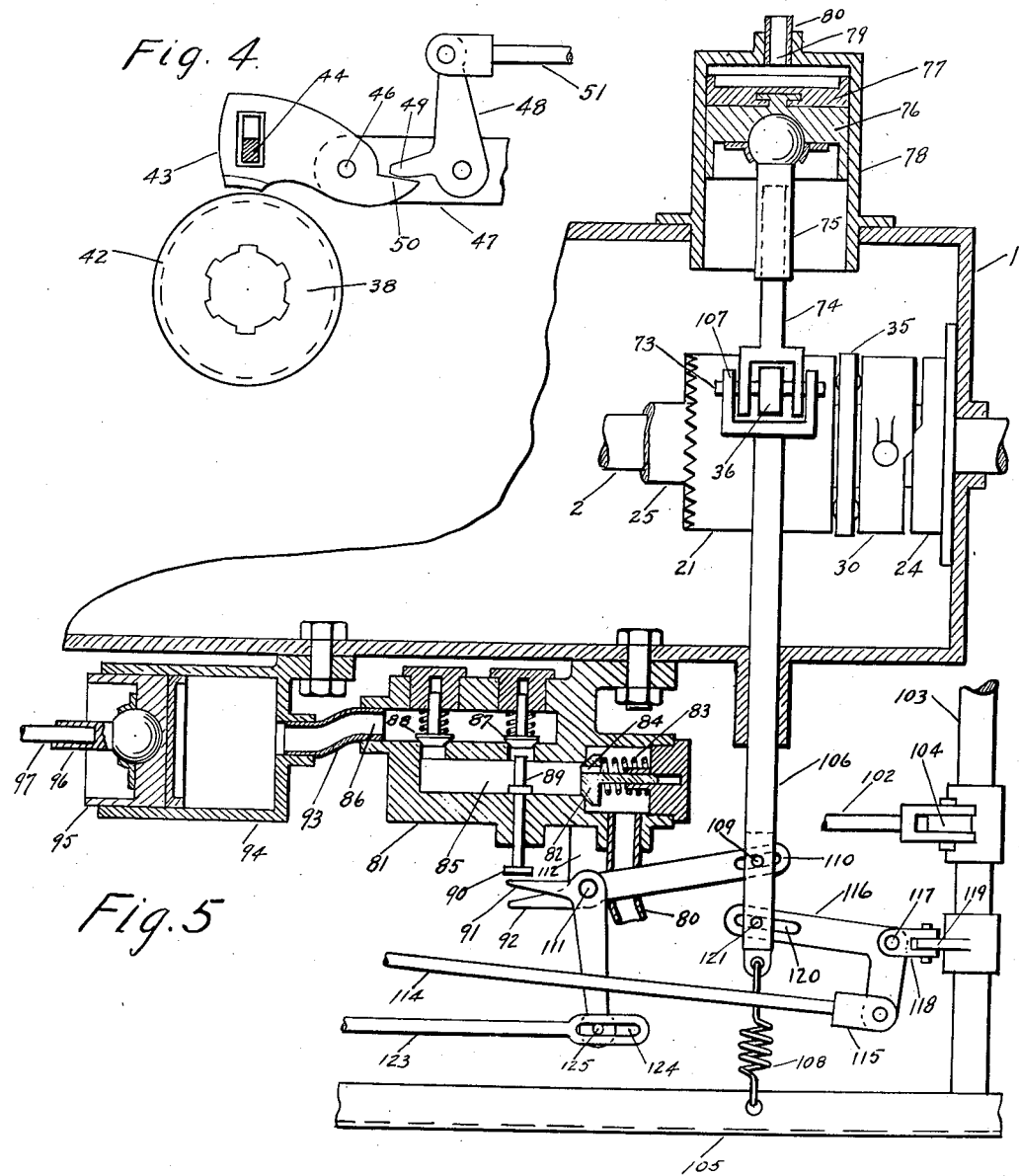
INVENTOR.
Charles M. Jameson Nov. 8, 1938.  C. M. JAMESON  2,135,897
AUTOMATIC BRAKE DEVICE
Filed June 13, 1934  3 Sheets-Sheet 3
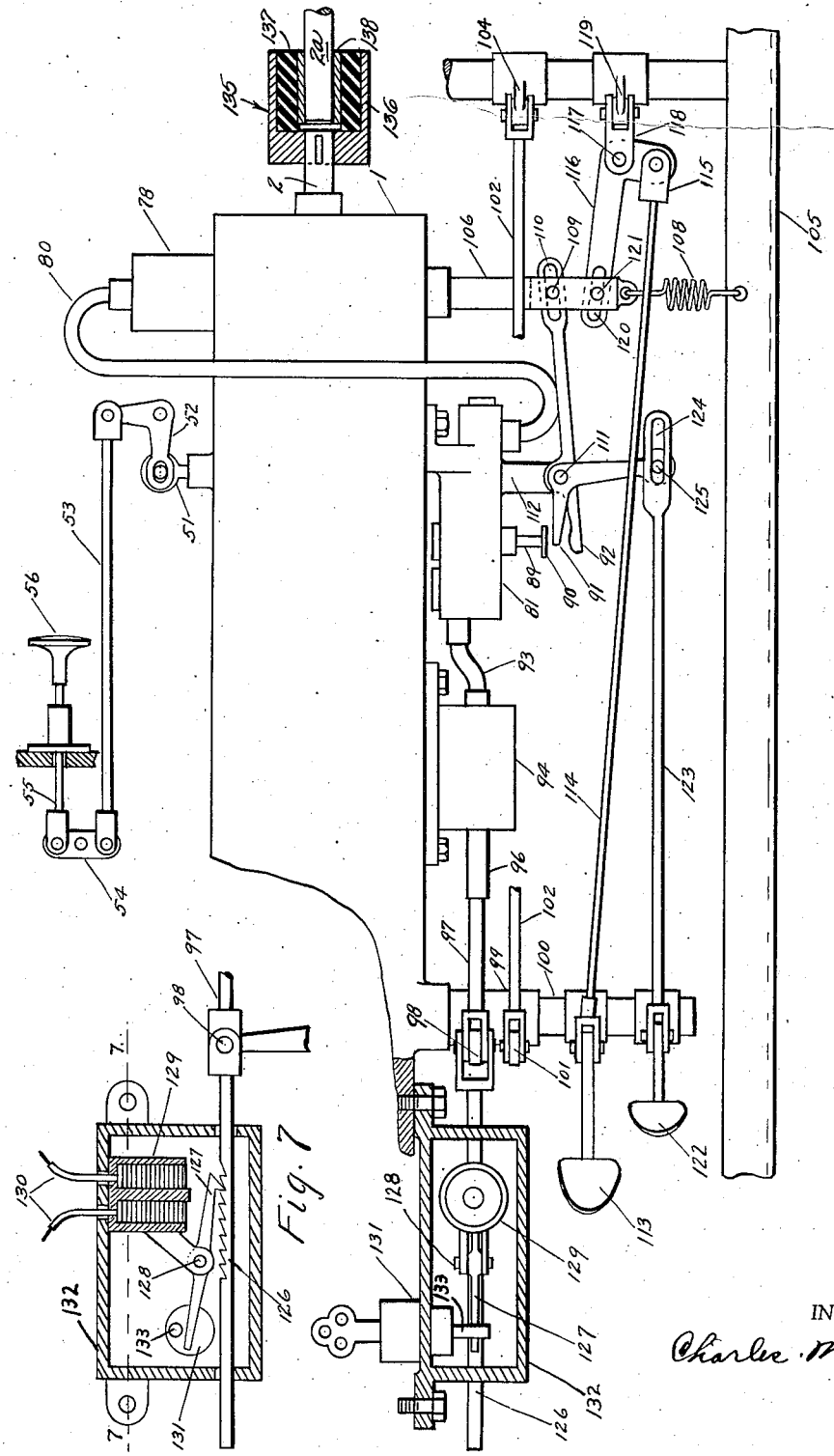
INVENTOR.
Charles M. Jameson Patented Nov. 8, 1938

2,135,897

UNITED STATES PATENT OFFICE 2,135,897

AUTOMATIC BRAKE DEVICE

Charles M. Jameson, Los Angeles, Calif., assignor to Automotive Devices, Inc., a corporation of California Application June 13, 1934, Serial No. 730,419

34 Claims. (Cl. 192—4)

This invention relates to means for maintaining a vehicle against unauthorized motion.

My copending applications Serial No. 590,169, filed Feb. 1, 1932, and Serial No. 604,401, filed April 11, 1932, show means by which an automobile is automatically prevented from rolling backward down a hill, unless in reverse gear, through application of the brakes and also through engagement of a positive restraint against rearward motion. My invention which is the subject of the present application accomplishes this purpose and in addition has the following objects:

An object of my invention is to make a mechanism which, when in any gear other than reverse, and after stopping of the car by means of manual application of the brakes, will maintain the brakes applied until the car is authorized to move by application of power or deliberate release of the brakes by other means.

A further object is to provide a device which eliminates the necessity of the hand-operated parking brake and also acts to prevent theft of the car.

Still another object is to make a mechanism which, after the car has been in reverse gear, does not restrict free rearward movement of the car while the gears are in any position until after actual forward movement of the car takes place.

Another object of the invention is to provide a device, in the operation of which, it shall be easy to shift into reverse gear without forward movement while the mechanism is under stress, as when the car is stationary on a steep hill.

Another object is to make a device which is dependable, of long life, and so compact that the principal parts thereof can be incorporated in a slightly enlarged transmission housing.

These objects I attain in a manner which will be clear from a consideration of the following description taken in connection with the drawings of which:

Fig. 1 is an elevational view, partly in section, of the interior of the transmission housing showing one part of the device in cooperation with a conventional transmission.

Fig. 2 is a sectional view of the ratchet and pawl assembly taken in the plane 2—2 of Fig. 1.

Fig. 3 is an enlarged plan view of a portion of Fig. 1.

Fig. 4 is a view of the mechanism for moving a pawl which is part of the mechanism shown in Fig. 1. The view is as from the plane 4—4 of Fig. 1, with the pawl in a different position, however.

Fig. 5 shows in detail the hydraulic cylinders, valves and linkage used to connect the apparatus of Fig. 1 to a brake system.

Fig. 6 illustrates the complete lay-out, giving the relative arrangement of the various parts of the invention. The solenoid-controlled ratchet and pawl mechanism is shown sectioned in a plane 7—7 of Fig. 7. The flexible joint 135 in the drive shaft 2 is shown in section, the section being taken in a diametrical plane of the shaft 2.

Fig. 7 is a side sectional elevation of the solenoid-controlled ratchet and pawl mechanism shown in Fig. 6, taken along a vertical longitudinal plane including the ratchet and the axis of the solenoid.

My invention will be disclosed as applied to an automobile in cooperation with a conventional transmission and brake system. 1 is the transmission housing providing support for the various parts of the transmission and enclosing the same to keep out dirt. 2 is the main drive shaft of the automobile. As pictured in Fig. 1, the rear of the car is at the right. The conventional system of gears and method of shifting is shown. A ball 3, being the end of the gear shifting lever, is slipped between jaws 4 and 5 which are attached to rod 6. (Jaw 5 is not rigidly attached to rod 6 for reasons which will later be explained.) Movement of rod 6 to the left causes similar movement of arm 7 carrying yoke 8 which moves gear 9 along splined portion 11 of shaft 2 into engagement with gear 10, bringing the transmission into low gear. A spring-loaded ball 70 dropped into a depression 71 maintains the gear 9 in mesh with gear 10. Movement of rod 6 to the right causes gear 9 to be engaged with gear 12 which meshes with gear 13 which is attached to the same shaft as gear 10, thus bringing the car into reverse gear. Ball 70 falling into depression 72 maintains the gears in reverse.

In the practice of my invention I provide a ratchet wheel 14 having teeth 15 which is permitted only a slight rotation with respect to the transmission housing except when the car is in reverse gear or is being put into reverse gear when the ratchet wheel is free to turn. Pawls 16 pivoting on pins 17 are carried by circular plate 18 which is held by a set-screw 19 on the splined portion 11 of shaft 2. As many as eight pawls are set at uniform distance around the plate 18, and it is preferable that there be an odd number of teeth, such as 33, on the ratchet 14. The pawls are held in position by no spring or other agency and are free to respond to the forces of gravity and inertia. When the shaft 2 and plate 18 are stationary those pawls that are above the ratchet wheel fall into engagement with it and those pawls below the shaft fall out of contact with the ratchet and are stopped by the circumferential ring 20 of plate 18.

It will be noted that Fig. 2 shows the ratchet and pawl mechanism as viewed from the rear of the car. Hence in forward motion of the car the shaft 2 and the pawls 16 revolve counter-clockwise in Fig. 2 and the ratchet is stationary, whereas in rearward motion of the car the pawls tend to revolve clockwise around the stationary ratchet. The teeth on the ratchet point in such a direction that the pawls engaging these teeth tend to rotate the ratchet when turned in a clockwise direction, corresponding to rearward motion of the car, but exert no force on these teeth when rotated in the counter-clockwise direction. Thus when the car has come to a stop and the upper pawls have dropped into engagement with the ratchet teeth, any rearward motion of the car will (unless the car is in reverse gear as will be explained later) cause clockwise rotation of the ratchet 14 with respect to the housing 1. This rotation is communicated to the ring 21 through teeth 22 on its front edge which engage teeth 23 on the back edge of ratchet wheel 14. Rotation of ring 21 and attached arm 36 in a clockwise direction applies the brakes of the car as will hereinafter be explained. During motion of the car at even a very low speed the pawls 16 fly outward by centrifugal force and rest against ring 20. Thus there is no wear due to dragging of pawls over ratchet, and it is only when the car comes to a stop that the pawls fall into engagement with the ratchet and in so doing come into position to apply the brakes upon subsequent rearward motion of the car.

Obviously provision must be made to put the system out of operation when it is desired to travel in reverse gear. This is accomplished by pushing under the pawls a series of pointed pins 37 and in this manner raising the pawls out of engagement with the ratchet. The pins 37 are fastened in a thick circular disc 38 which is slidably mounted on the splined portion 11 of shaft 2. A ball 39 and spring 40 are set in a recess inside disc 38, and the ball seating in a depression 41 in shaft 2 holds the disc in such a position that the pins 37 are out of engagement with the pawls unless the disc is deliberately moved. When rearward movement of the car is authorized by shifting the transmission into reverse gear by moving gear 9 into engagement with gear 12, gear 9 at the same time strikes disc 38, moves it rearwardly, and pushes pins 37 under pawls 16 raising them out of engagement with the ratchet and permitting rearward movement of the car without applying the brakes.

While the pins 37 are pushed under the pawls when gear 9 is shifted into the reverse position, the pins are not withdrawn when gear 9 is removed from the reverse position. If it were the following difficulty would occasionally arise. After the car had been in reverse and while still moving slowly backward, and the transmission were then shifted out of reverse, there would be a sudden grabbing of the brakes. To avoid the possibility of this happening the pins 37 are only withdrawn after the car has moved forward enough to permit the drive shaft to turn one-half revolution in the forward direction. This is accomplished as follows. The circumferential edge of the disc 38 is formed in a buttress-shaped thread 42 which travels toward the rear of the car as it proceeds in a clockwise direction around the disc as viewed from the rear. The pitch of the thread is twice the total movement of the disc, so that when a pawl 43 is dropped into the thread and the disc is turned counter-clockwise, or forward, the disc and pins 37 travel frontward in one-half revolution into the position shown by reason of the screw thread engagement of the pawl. The pawl 43 is lifted out of engagement with the threads when the transmission is shifted into reverse by means of the member 44, attached to arm 7 and having a ramp 45 on its upper surface which engages the lower edge of a hole in pawl 43. The threads on disc 38 are so shaped that the depressions have vertical sides on the front and slanting sides on the rear. The pawl 43 is shaped to fit these depressions. The object of this shape of thread is to cause the disc to be threaded forward when the pawl is in engagement therewith and when the disc is rotated counter-clockwise, but to permit the disc, when in the extreme rearward position, to turn clockwise with the pawl 43 in engagement without any tendency to screw the disc into a still more rearward position. The necessity for this provision arises when the car has been going backward in reverse and the transmission is shifted out of reverse while the car is still going backward. Under these conditions the pawl 43 simply rides up over the threads 42 as it would over a set of ratchet teeth advancing toward the front of the car.

The pawl 43 is taken advantage of by cooperation with another mechanism to make it possible to throw in or out of operation at will the system which applies the brakes automatically upon rearward motion of the car. The pawl 43 is pivoted on a pin 46 connected to a stationary bracket 47. A lever 48 is likewise pivoted on a pin attached to bracket 47. The projection 49 of lever 48 is adapted to engage the heel 50 of pawl 43 and lift it out of engagement with threads 42 of disc 38. The lever 48 is operated by means of rod 51, bell crank 52, rod 53, lever 54, rod 55 and button 56. Hence by pulling out button 56 after the car has been in reverse gear, the pawls 16, which were lifted out of engagement by the pins 37, are kept in this position because only the engagement of pawl 43 with threads 42 can withdraw the pins 37, and this cannot occur. Thus, with button 56 pulled out, the car performs as if the entire device were left off.

It is now important to understand the construction of the unit comprising the ratchet and the parts between it and the rear of the housing 1. Riveted or otherwise solidly fastened to the housing 1 is a flanged plate 24 surrounding the shaft 2. This plate 24 carries a sleeve 25 concentric with shaft 2, but having clearance therefrom so as not to constitute a bearing. Sleeve 25 extends through to the far end of ratchet 14 where a threaded end receives a nut 26. The front edge of member 24 consists of two surfaces 28 and 29 connected by a ramp 27. A ring 30 having connection to the reverse gear shifting mechanism through arm 31 is mounted to rotate and slide on sleeve 25 and has on its rearward edge two surfaces 32 and 33 connected by the ramp 34 in such manner that the rearward edge of ring 30 matches in shape the front surface of plate 24. The ring 21 is also mounted to rotate and slide on sleeve 25. Between ring 21 and ring 30 is a thrust type ball bearing 35 capable of sliding on sleeve 25. This bearing may simply consist of V shaped grooves in adjacent edges of rings 21 and 30 and balls in these grooves. The nut 26 is screwed on to a point where, when surface 32 engages surface 29, only working clearance in the system is had. It will be noted that the entire assembly of parts from the ratchet to the housing is supported on the sleeve 25 and is completely independent of the drive shaft 2.

This assembly on sleeve 25 is designed as it is in order to accomplish a very important function, namely, to permit the transmission to be shifted into reverse when the mechanism is under stress, as when after going forward up a steep hill the system has been permitted to operate to prevent rearward movement by application of the brakes. Under these conditions the pawls 16 are held with great force against the teeth of ratchet 14 and the frictional force to be overcome in raising the pawls 16 by introduction of the pins 37 is so great that the gear 9 cannot be shifted into the reverse position unless special provision is made. In my system, the ratchet 14 is set free to rotate before gear 9 is required to be moved, so that no frictional force resists the introduction of pins 37 and shifting into reverse is as easy as on any car. This I accomplish as follows:

Jaw 5 is movable separately from jaw 4. Jaw 5 is pinned by pin 57 to rod 58 which slides in the bore of rod 6. A vertical slot 59 in the remaining shell of rod 6 accommodates the pin 57 and serves to limit the movement of jaw 5 along rod 6. A collar 60 is immovably attached to the rod 6 and a spring 61 surrounds the rod and abuts at one end against collar 60 and at the other end against jaw 5. Pinned to rod 58 by pin 62 which slides in another slot 63 in the shell of rod 6 is bell crank 64 which pivots on pin 65 supported by stationary bracket 66. On the other end of the bell crank is a ball and socket joint 67 to a link 68 which joins by another ball and socket joint 69 to the vertical arm 31.

In authorizing rearward movement of the automobile by shifting into reverse gear, if any resistance is met, the jaw 5 slides along rod 6 carrying with it rod 58 and all the while compressing spring 61. As rod 58 moves toward the rear, bell crank 64 turns carrying link 68 toward the right side of the car and turning arm 31 and ring 30 clockwise as viewed from the rear. Thrust bearing 35 reduces the friction opposing this motion to a degree where it is not noticeable. This causes surface 32 to slip off surface 29 onto surface 28. The brake system is pushing on arm 36 in a counter-clockwise direction, tending by reason of the angle of teeth 22 and 23 to cause ring 21 to slip toward the rear, and since with ring 30 out of the way, there is nothing now on sleeve 25 to prevent slipping of ring 21 along sleeve 25, ring 21 does so slip toward the rear disengaging teeth 22 and 23. The ratchet 14 is now entirely free to rotate and consequently can offer no frictional resistance to the introduction of pins 37 under the pawls 16. The gear 9 can then follow through into the reverse position and it does so quite rapidly inasmuch as the force of compression of spring 61 is available for finishing this shifting operation. The whole operation takes place so quickly and so smoothly that one notices no difference from a conventional shift.

It has been stated that clockwise rotation of arm 36 applies the brakes. The mechanism through which this takes place is as follows. Through the end of the arm 36 there passes a pin 73. A clevised rod 74 also connects with this pin. The end of rod 74 slips into a bored piston rod 75 but is not fastened to it. Piston rod 75 makes a ball and socket joint with piston 76, preferably having a front face 77 of rubber. This piston slides in a cylinder 78 mounted on the housing 1 and having an outlet 79 at which place a pipe 80 joins. The cylinder 78 is part of a hydraulic system which is filled with a fluid commonly employed in hydraulic brake systems. Pipe 80 leads into valve block 81 mounted on housing 1. The passage from pipe 80 first encounters a check valve 82 which is held closed by spring 83 but which has a small hole 84 drilled through the valve, so that when pressure exists in pipe 80 greater than on the other side of the valve, fluid passes slowly through the hole 84 but when the pressure is in the opposite direction the entire valve opens and permits fluid to pass freely. Valve 82 opens into passage 85 which is connected with passage 86 by two check valves 87 and 88. Valve 87 may be held open by rod 89 which passes through the wall of the block and ends in a button 90 on one-half of which lever 91 bears and on the other half of which lever 92 bears. A pipe 93 joins passage 86 with a second hydraulic cylinder 94 in which slides a piston 95 joined by a ball and socket joint to a piston rod 96 having a bored end into which slides a rod 97 which, however, is not fastened to rod 96. Rod 97 ends in a clevis which acts through a pin on a lever 98 attached to a collar 99 which is rotatably mounted on a rod 100. Attached to collar 99 is also another lever 101 which acts through a pin and clevis on a rod 102 running back to the transverse brake rod 103 to which are attached rods or cables running to the brakes on the car wheels, all of which latter mechanism is common practice. Rotation of the rod 103 in a counter-clockwise direction as viewed from the frame member 105 applies the brakes. Rod 102 acts through a clevis and pin on lever 104 which is firmly fastened to rod 103 which is rotatably mounted in frame 105 of the car. A rod 106 passes through the transmission housing and carries a clevis 107 on its end on which pin 73 acts. Rods 106 and 74 extend in opposite directions from the pin 73. The rod 106 is pulled away from the transmission by a spring 108 which is fastened at one end to the rod 106 and at the other end to the car frame 105. The rod 106 has projecting from it a pin 109 which slides in a slot 110 in the lever 92 which is pivoted on a pin 111 mounted on the stationary bracket 112. The foot brake pedal 113 is connected through the usual lever mechanism to actuate rod 114 which terminates in a clevis 115 in pinned connection to bell crank 116 which pivots about a pin 117 of link 118 which actuates through a pin connection lever 119 fastened solidly to transverse brake rod 103. The other end of bell crank 116 has a slot 120 in which fits a pin 121 set in rod 106.

When the brakes are applied automatically by rotation of the arm 36 in the direction of cylinder 78 the piston 76 is caused to force fluid out of cylinder 78 through pipe 80, through the small hole 84 which limits the quickness with which the brake setting action takes place, through either or both check valves 87 and 88 and pipe 93, into cylinder 94. The fluid pushes against piston 95 and rod 97, turning collar 99 and pulling rod 102 which acts on rod 103 to apply the brakes. When the tendency of arm 36 to move toward cylinder 78 ceases, as when the car is started forward, the spring 108 pulls rod 106, arm 36 and rod 74 toward frame member 105 turning the lever 92 to contact button 90 and opens valve 87 whereupon the fluid pressure in cylinder 94 is relieved and the brakes are released. The fluid can quickly escape back into cylinder 78 through opening wide the check valve 82.

Another very important feature of my invention is made possible by this construction. When the car is brought to rest, while in any gear other than reverse, by manual application of the brakes, the brakes remain applied even though the foot is removed from the brake pedal until the car has started to move by deliberate application of power or by deliberate release of the brakes by other means to be described. This feature is particularly advantageous in driving through city traffic where quite commonly it is necessary to stop for an interval on a slight grade, in which case one does not have to hold his foot on the foot brake pedal during the time of stopping. The brake will remain applied while on a down grade as well as on an up grade. The manner in which this happens is as follows.

When brake pedal 113 is pushed forward, pulling rod 114 and tending to pull forward lever 119 to rotate rod 103 to apply the brakes, bell crank 116 is turned and pushes on pin 121 and rod 106 with a force proportional to that which is applying the brakes. The motion of rod 106 rotates ring 21 and ratchet 14 clockwise as viewed from the rear and when the car finally stops or comes to a very slow speed the pawls 16 drop into engagement with ratchet 14 and prevent arm 36 and rod 106 from returning, for if it should return, lever 92 would engage button 90 and open the valve 87 which, as will presently be brought out, would defeat the purpose of the mechanism. At the same time that the brake is being applied by rotation of rod 103, rod 102 is being actuated to withdraw the piston 95 from cylinder 94. Since rod 97 makes a telescoping connection to rod 96, should any condition make impossible the withdrawal of piston 95, the rod 97 would still withdraw and not hinder the operation of the brake pedal. Simultaneously rod 74 is being pushed by rod 106 to act on piston 76 of cylinder 78 and force fluid through the system to follow up the motion of piston 95. Since neither of the levers 91 and 92 are bearing on button 90, and check valves 87 and 88 are both closed, the fluid is trapped in cylinder 94 and connecting passages and cannot get back into cylinder 78. Thus the brakes are held applied in whatever degree they have been manually applied; the greater the foot pressure on the pedal 113 the greater is the movement of trapped liquid into cylinder 94.

When it is desired to go forward, the car is put in one of the forward gears and power is applied to the drive shaft. For the first fraction of a revolution of the drive shaft, while the brakes are set, the power of the engine must overcome the resistance of the brakes in order to have the drive shaft turn. This action is assisted by the flexibility of the drive shafts of modern cars which permits the drive shaft at a point near the transmission to turn through a considerable angle without moving the wheels of the car. The result is that the additional effort of the engine in turning the drive shaft through the first fraction of a revolution against the brakes is entirely imperceptible. As the drive shaft turns forward the pawls 16 rotate out of engagement with ratchet 14, permitting the ratchet to follow the pawls. This causes piston 76 to be withdrawn from cylinder 78, or at least rod 74, the withdrawal of which permits piston 76 to be pushed back by the fluid to follow rod 74. At the same time, through the return motion of rod 106 and lever 92, the check valve 87 is opened, releasing the fluid from cylinder 94 into cylinder 78. The piston 95 is thus permitted to return into the cylinder 94 and the brakes are released.

After the brakes have been manually applied and the car has stopped and the brakes are automatically held and it is desired to go backward the action is as follows. The transmission is shifted into reverse which permits axial movement of ring 21 away from ratchet 14 and allows rod 106 with arm 36 and rod 74 to return under action of spring 108. Lever 92 then opens valve 87 relieving the fluid pressure and releasing the brakes. Pins 37 are inserted to raise pawls 16 out of engagement with ratchet 14 and the car is in condition for applying power to proceed backward. It is obvious that the brakes may be released for forward motion also by simply shifting gears into reverse and out again without application of power.

I provide mechanism affording another convenient method of releasing the brakes after they have been manually applied to bring the car to a stop. The pedal 122 is the clutch pedal operating the clutch through well known mechanism not shown. I make use of this pedal by attaching through a clevis to the lever operated by the clutch pedal a rod 123 which at its rearward end is flattened and has a slot 124 in which stands a pin 125 fastened to one end of the bell crank 91. The proportions are so adjusted that in all ordinary movement of the pedal 122, employed in engaging and disengaging the clutch, the pin 125 is simply slid over by slot 124 without ever contacting either end of the slot. But if it is desired to release the brakes after stopping by manually applying them, it is merely necessary to push the clutch pedal 122 forward an abnormally long distance until pin 125 is engaged by the back end of slot 124 and carried forward sufficiently far to cause button 90 to be acted upon to open valve 87. This allows the fluid pressure in cylinder 94, due to the force of applying the brake, to be transmitted to the piston of cylinder 78 through check valve 82 and pipe 80. While the resistance of the brakes and rigidity of the drive shaft are sufficient to prevent movement of rachet 14 against pawls 16 when only the tension of spring 108 is tending to turn ratchet 14, when the fluid pressure acting upon piston 76 is also added to the force tending to move ratchet 14, the resistance is not sufficient and the pawls 16 are forced to rotate in the forward or counter-clockwise direction through a slight angle. This motion permits piston 76 to recede from the cylinder 78 and allows the piston 95 to follow into its cylinder to release the brakes. If the car is headed forward down a hill it will then coast, and this method of releasing the brakes is particularly efficient in this situation. An important factor in permitting the pawls 16 to rotate under the force due to pressure in the fluid system exerted through rod 74, arm 36 and ratchet 14, is the flexibility of the drive shafts of modern cars. This flexibility permits the pawl carrier 18 to rotate through a considerable angle without the wheels being moved against the brakes. Of course, if greater flexibility is required a supplementary flexible joint such as a flexible rubber member 135 can be installed in the drive shaft 2. The flexible member 135 may consist of a cylindrical shell 136 keyed to or press fitted onto the shaft 2 and having vulcanized to its inner surface an annular piece of rubber 137 which is also vulcanized to a metal sleeve 138 into which is keyed or press fitted the continuation 2a of the drive shaft. Thus the two portions 2 and 2a of the drive shaft are permitted to angularly deflect relative to one another by virtue of the angular deflection of the interconnecting rubber.

Another important feature of my invention is the elimination of the necessity of a parking brake. It has already been pointed out that when the car is brought to a stop by manually applying the brakes, the brakes are then automatically held applied. All that remains to make of this a perfect parking brake is to provide an additional mechanism that will insure against someone getting into the car and unintentionally releasing the brakes by shifting into reverse gear or by depressing the clutch pedal. I provide such additional mechanism in such a form that when the ignition is turned off neither of the above-mentioned methods of releasing the brake is operative. Connected to the system 97—98 is a straight ratchet 126 which moves in the same direction as rod 97 and has teeth which point backward. A pawl 127 with a pivot 128 which is supported stationarily is adapted to engage ratchet 126. A solenoid 129 is supported from housing 132 bolted to the car frame and is adapted to lift pawl 127 out of engagement with ratchet 126 when energized through wires 130 which are in circuit with the ignition so that when the car ignition is turned on the pawl 127 is drawn up out of the way of ratchet 126. When the car is brought to a stop by manually applying the brakes, or indeed through automatic application on rearward movement of the car, and the foot is removed from the brake pedal, the brakes remain set. If now the ignition is turned off, the pawl 127 will fall into engagement with the ratchet 126 and hold the lever 98 and connected parts from returning to their normal positions even though the ordinary brake-releasing means have been operated. On starting the car again, when the ignition is turned on the pawl 127 will tend to lift out of engagement with ratchet 126. If the ratchet has actually exerted force on the pawl it may be that the frictional force between the two will be sufficient to prevent the pawl from lifting out of engagement. If such is the case, the brake pedal is depressed slightly beyond the position in which it is held whereupon the ratchet is pushed beyond the pawl, releasing it. To provide against the case in which the battery goes dead after the car has been parked and the ignition turned off, in which case the pawl is left engaging the ratchet with no way to raise it, I have provided a lock 131, operable by a key, the said lock being mounted on the housing 132 and adapted to lift the pawl out of engagement with the ratchet 126, by reason of engagement of pin 133 with the end of pawl 127, in one position of the key and to leave the pawl undisturbed in the other position of the key. The use of a lock and key to perform this function makes it inconvenient for anyone to release the brake after the ignition has been turned off. It is thus evident that I have provided both a very simple and convenient parking brake and a very effective means for preventing theft of the car.

The operation of an automobile incorporating my device may be summarized as follows. Assume the car to be stationary on a horizontal road and in neutral gear. The car is started forward in the same manner as any car unequipped with my device. Assume that the car travels up a hill and that, while on the up-grade, it is necessary to stop the car, as at a busy intersection. The car comes to a stop like any other car but, instead of rolling backward if the brake is not applied, it will not roll backward and it is not necessary to apply the brakes manually to hold the car on the hill as the brakes are automatically applied upon the first movement of the car rearwardly. If it is desired to go forward from this position, the car is shifted into the proper gear and accelerated in the usual manner except that this operation is greatly simplified because one does not have to hold his foot on the brake and accelerate at the same time as with the ordinary car. If, from the position of rest on an up-grade, it is desired to go backward, the transmission is shifted into reverse, as usual, without any increased force being required to operate the shifting lever, and the car will immediately coast backward down the hill or it may be moved under the power of the engine in the usual manner.

If, while going backward down the hill, it is desired to stop and go forward, the brakes are applied in the usual manner either before or after shifting the car out of reverse. In other words, the transmission may be shifted out of reverse into neutral or any other gear while the car is moving rearwardly without any noticeable effect but in all respects like an ordinary car, and after the car has come to rest and started forward the device is automatically reset for automatically applying the brakes upon further unauthorized rearward movement of the car. It is possible to make inoperative the device for automatically applying the brakes upon unauthorized rearward movement of the car, and this is done by shifting the transmission into reverse and, before allowing any forward movement of the car, pulling out a button provided for that purpose.

Now assume the device to be in operative condition and the car to travel forward onto a downgrade hill. When it is desired to stop, the brakes are manually applied as usual, but if the car comes to rest the brakes remain applied even though the foot is removed from the pedal. If, however, it is desired to start again, either in reverse or forward gear, the transmission may be shifted and the car started under power in exactly the same way as with an ordinary car. If it is desired to coast forward from the position at rest after the brakes have been applied this may be accomplished by shifting the transmission into reverse. Upon shifting into reverse, the brakes are released, whereupon the transmission may be shifted into any other gear and the car operated as usual. Another way to release the brakes in a position of rest of the car after the brakes have been applied is to push the clutch pedal down an abnormally great distance.

Assume, now, the car to be traveling forward, and it is desired to park along the curb. The car is brought to a stop in the usual manner by manually applying the brakes, whereupon the brakes remain applied after the foot is removed from the pedal. When the ignition is turned off to stop the engine the brakes are automatically locked in the applied position and can not be released by shifting into reverse or pushing the clutch pedal as ordinarily until the ignition is again turned on. This is an effective means for preventing the parking brake from being accidentally released while the car is on a hill and causing damage by coasting wild down the hill as often happens. If the battery is dead so that no ignition current is available to cause release of the brakes, they may be released by unlocking with a key a releasing lock under the hood. The car is started under power from the condition of locked brakes, in either forward or reverse directions in the same manner as an ordinary car with no consciousness of anything different.

I have accomplished my objects by means of a system that has through rigid tests proven a practicable one. It has been found that no abnormal wear occurs in any part. The system is almost entirely foolproof. One important feature of it is that a person driving for the first time a car employing my system need never be given any special instruction on what to do and what not to do. The car is driven like any ordinary car and the advantages automatically assert themselves.

It will be understood, of course, that various changes and modifications in the construction and arrangement of parts may be made by those skilled in the art without departing from the spirit and scope of the invention. For this reason I wish to be limited only by the appended claims.

What I claim as new and desire to secure by Letters Patent is:

1. In an automobile equipped with brakes and having a drive shaft, the combination of a ratchet, pawls engageable with said ratchet during slow speed of the automobile and when it is at rest, a carrier for said pawls moved by said drive shaft, said pawls cooperating with said ratchet to move said ratchet upon unauthorized rearward movement of said automobile, means in connection with said ratchet controlled by movement of said ratchet for applying the brakes, and means adapted upon authorizing rearward movement of the automobile to first disconnect said first-mentioned means from said ratchet and then to disengage said pawls from said ratchet.

2. In an automobile equipped with brakes and a transmission having forward and reverse positions and having a drive shaft, the combination of a ratchet wheel, pawls engageable with said ratchet wheel during slow speed of the automobile and when it is at rest, a carrier for said pawls rotated by said drive shaft, said pawls cooperating with said ratchet wheel to turn said ratchet wheel upon unauthorized rearward movement of said automobile, a member connectible with said ratchet wheel, means controlled by movement of said member for applying the brakes, a second member wedged between said first member and a stationary portion of said transmission in such manner as to hold said first member in connection with said ratchet, and means adapted upon shifting the transmission into reverse to first un-wedge said second member and then to disengage said pawls from said ratchet.

3. In an automobile equipped with brakes and a transmission having forward and reverse positions and having a drive shaft, the combination of a ratchet, pawls engageable with said ratchet during slow speed of the automobile and when it is at rest, a carrier for said pawls moved by said drive shaft, said pawls cooperating with said ratchet to move said ratchet upon unauthorized rearward movement of said automobile, means in connection with said ratchet controlled by movement of said ratchet for applying the brakes, means adapted upon shifting the transmission into reverse to disconnect said first-mentioned means from said ratchet, means adapted upon continued movement of said second-mentioned means to disengage said pawls from said ratchet, and a resilient member interposed between said second-mentioned means and said last-mentioned means.

4. In an automobile equipped with brakes and a transmission having forward and reverse positions, shifting means therefor, and having a drive shaft, the combination of a stationary sleeve on said drive shaft, a ratchet wheel rotatably mounted on said sleeve, a pawl carrier attached to said drive shaft, pawls pivoting on said pawl carrier engageable with said ratchet wheel to rotate said ratchet wheel upon unauthorized rearward movement of the automobile, said pawls, however, being adapted to disengage from said ratchet wheel by reason of centrifugal force when said drive shaft is in rotation, a series of angularly shaped projections on a face of said ratchet wheel, a ring rotatably and slidably mounted on said sleeve adjacent said ratchet wheel, a series of angularly shaped projections on the face of said ring corresponding to and adapted to engage the projections on said ratchet wheel to provide rotative connection between said ratchet wheel and said ring, means controlled by rotation of said ring for applying the brakes, a stationary plate connected to said sleeve and having on its face a projecting portion connected with the surface of said plate by a ramp, a second ring mounted rotatably and slidably on said sleeve between said plate and said first ring and having on its face a projecting portion connected with said face by a ramp, said projecting portion of said second ring being adapted to engage said projecting portion of said plate to hold said first ring in rotative connection with said ratchet wheel, means controlling rotation of said second ring and engageable by said shifting means whereby when the transmission is shifted into reverse the projecting portion of said second ring slips onto the surface of said plate releasing said first ring from rotative connection with said ratchet wheel, and means for disengaging said pawls from said ratchet wheel upon continued movement of said shifting means.

5. In an automobile equipped with brakes and a transmission having forward and reverse positions and having a drive shaft, the combination of a ratchet, a pawl carrier moved by said drive shaft, pawls on said pawl carrier engageable with said ratchet during slow speed of the automobile and when it is at rest, said pawls cooperating with said ratchet to move said ratchet upon unauthorized rearward movement of the automobile, means controlled by the movement of said ratchet for applying the brakes, means adapted upon shifting the transmission into reverse to disengage said pawls from said ratchet and hold them disengaged while the transmission is in reverse, and means withdrawing from operation said disengaging means upon forward rotation of said drive shaft.

6. In an automobile equipped with brakes and a transmission having forward and reverse positions and having a drive shaft, the combination of a ratchet wheel, pawls engageable with said ratchet wheel during slow speed of the automobile and when it is at rest, a carrier for said pawls rotated by said drive shaft, said pawls cooperating with said ratchet wheel to rotate said ratchet wheel upon unauthorized rearward movement of the automobile, means controlled by rotation of said ratchet wheel for applying the brakes, a member carrying projecting pins adapted to encounter said pawls and disengage said pawls from said ratchet wheel when said member is moved toward said pawl carrier, means for moving said member toward said pawl carrier to disengage said pawls when the transmission is shifted into reverse, and means for withdrawing said pins from contact with said pawls upon forward rotation of said drive shaft.

7. In an automobile equipped with brakes and a transmission having forward and reverse positions and having a drive shaft, the combination of a ratchet wheel, a pawl carrier rotated by said drive shaft, pawls on said pawl carrier engageable with said ratchet wheel during slow speed of the automobile and when it is at rest, said pawls cooperating with said ratchet wheel to rotate said ratchet wheel upon unauthorized rearward movement of the automobile, means controlled by rotation of said ratchet wheel for applying the brakes, a disc carrying projecting members adapted to encounter said pawls and disengage said pawls from said ratchet wheel when said disc is moved toward said pawl carrier, means for moving said disc toward said pawl carrier to disengage said pawls when the transmission is shifted into reverse, buttress-shaped threads on the circumferential edge of said disc, a stationary pawl adapted to engage said threads and screw said projecting members out of contact with said pawls upon forward rotation of said drive shaft but to ride over said threads without translation of said disc upon reverse rotation of the drive shaft, and means for moving said stationary pawl out of possible contact with said disc.

8. In an automobile equipped with brakes, a transmission having forward and reverse positions, and having a drive shaft, the combination of a ratchet, pawls engageable with said ratchet during slow speed of the automobile and when it is at rest, a carrier for said pawls moved by said drive shaft, said pawls cooperating with said ratchet to move said ratchet upon unauthorized rearward movement of said automobile, means in connection with said ratchet controlled by movement of said ratchet for applying the brakes, means adapted upon shifting into reverse to first disconnect said first-mentioned means from said ratchet and then to disengage said pawls from said ratchet and hold them disengaged while the transmission is in reverse, and means withdrawing from operation said disengaging means upon forward rotation of said drive shaft.

9. In an automobile equipped with brakes and a means for manual application of the brakes, and having a drive shaft, the combination of a ratchet, pawls engageable with said ratchet during slow speed of the automobile and when it is at rest, a carrier for said pawls moved by said drive shaft, said pawls cooperating with said ratchet to move said ratchet upon unauthorized rearward movement of the automobile, means controlled by movement of said ratchet for applying the brakes, means for moving said ratchet under said pawls upon manual application of the brakes, means preventing the brakes from releasing after having been applied, and means adapted to render inoperative said last-mentioned means.

10. In an automobile equipped with brakes and a means for manual application of the brakes, and having a drive shaft, the combination of a ratchet, pawls engageable with said ratchet during slow speed of the automobile and when it is at rest, a carrier for said pawls moved by said drive shaft, said pawls cooperating with said ratchet to move said ratchet upon unauthorized rearward movement of the automobile, means for moving said ratchet under said pawls upon manual application of the brakes, a hydraulic cylinder, a piston in said cylinder adapted to force fluid from said cylinder upon movement of said ratchet, pressure actuatable hydraulic means connected to said cylinder for applying the brakes, a check valve between said cylinder and said hydraulic means permitting fluid to flow away from said cylinder, and means adapted to open said check valve.

11. In an automobile equipped with brakes and a means for manual application of the brakes, and having a drive shaft, the combination of a ratchet, pawls engageable with said ratchet during slow speed of the automobile and when it is at rest, a carrier for said pawls moved by said drive shaft, said pawls cooperating with said ratchet to move said ratchet upon unauthorized rearward movement of the automobile, means for moving said ratchet under said pawls upon manual application of the brakes, a hydraulic cylinder, a piston in said cylinder adapted to force fluid from said cylinder upon movement of said ratchet, pressure actuatable hydraulic means connected to said cylinder for applying the brakes, a check valve between said cylinder and said hydraulic means permitting fluid to flow away from said cylinder, and means operated by the return of said ratchet for opening said check valve.

12. In an automobile equipped with brakes, a means for manually applying the brakes, a transmission having forward and reverse positions, and having a drive shaft, the combination of a ratchet, pawls engageable with said ratchet during slow speed of the automobile and when it is at rest, a carrier for said pawls moved by said drive shaft, said pawls cooperating with said ratchet to move said ratchet upon unauthorized rearward movement of the automobile, means for moving said ratchet under said pawls upon manual application of the brakes, means in connection with said ratchet controlled by movement of said ratchet for applying the brakes, means adapted upon shifting into reverse to first disconnect said last-mentioned means from said ratchet and then to disengage said pawls from said ratchet and hold them disengaged while the transmission is in reverse, means withdrawing from operation said disengaging means upon forward rotation of said drive shaft, means preventing release of the brakes after having been applied, and means adapted to render inoperative said last-mentioned means.

13. In an automobile equipped with brakes and means for manual application of the brakes, and having a drive shaft, the combination of a ratchet, pawls engageable with said ratchet during slow speed of the automobile and when it is at rest, a carrier for said pawls moved by said drive shaft, said pawls cooperating with said ratchet to move said ratchet upon unauthorized rearward movement of the automobile, means for moving said ratchet under said pawls upon manual application of the brakes, a hydraulic cylinder, a piston in said cylinder adapted to force fluid from said cylinder upon movement of said ratchet, pressure actuatable hydraulic means connected to said cylinder for applying the brakes, a check valve between said cylinder and said hydraulic means permitting fluid to flow away from said cylinder, means adapted to open said check valve, a second check valve between said cylinder and said hydraulic means opening in the direction of said cylinder, and a restricted passage permitting fluid to flow in either direction from one side of said second check valve to the other side thereof.

14. In an automobile equipped with brakes, and a means for manually applying the brakes irrespective of the direction of movement of said automobile, the combination of means automatically applying the brakes upon unauthorized rearward movement of the automobile, means preventing release of the brakes after having been applied, and means adapted to render inoperative said last-mentioned means.

15. In an automobile equipped with an ignition circuit, brakes, and a means for manually applying the brakes, the combination of means for preventing release of the brakes after having been applied, means adapted to render inoperative said last-mentioned means, additional means independent of said other means for preventing release of the brakes after having been applied and functioning when said ignition circuit is open.

16. In an automobile equipped with an ignition circuit, brakes, and a means for manually applying the brakes, the combination of means for preventing release of the brakes after having been applied, means adapted to render inoperative said last-mentioned means, additional means independent of said other means for preventing release of the brakes after having been applied and functioning when said ignition circuit is open, and means controlled by lock and key to render inoperative said additional means.

17. In an automobile equipped with an ignition circuit, brakes, and a means for manually applying the brakes, the combination of means for preventing release of the brakes after having been applied, means adapted to render inoperative said last-mentioned means, a ratchet connected to the means for manually applying the brakes, a stationary pawl adapted to engage said ratchet and prevent release of the brakes after having been applied, and an electromagnet connected in the ignition circuit and adapted when energized to attract said pawl out of engagement with said ratchet.

18. In an automobile having an ignition circuit, brakes, and a means for manually applying the brakes, the combination of means for preventing release of the brakes after having been applied, means adapted to render inoperative said last-mentioned means, a ratchet connected to the means for manually applying the brakes, a stationary pawl adapted to engage said ratchet and prevent release of the brakes after having been applied, an electromagnet connected in the ignition circuit and adapted when energized to attract said pawl out of engagement with said ratchet, and means controlled by lock and key to disengage said pawl from said ratchet.

19. In an automobile equipped with brakes, the combination of a movable member, means engageable with said member and adapted to move said member upon unauthorized rearward movement of the automobile, means in connection with said member controlled by movement of said member for applying the brakes, and means adapted upon authorizing rearward movement of the automobile to first disconnect said last-mentioned means from said member and then to disengage said first-mentioned means from said member.

20. In an automobile having a drive shaft and equipped with brakes and a means for manually applying said brakes to stop the automobile, the combination of means for automatically applying said brakes upon unauthorized rearward movement of the automobile, means acting upon authorizing rearward movement of the automobile to prevent functioning of said means for automatically applying the brakes, and means adapted to restore to operation said means for automatically applying the brakes only after forward rotation of said drive shaft.

21. In an automobile equipped with brakes and having a transmission provided with driving and driven parts operable in forward and reverse directions for the control of the automobile, one of said parts including a drive shaft, means for automatically applying the brakes upon unauthorized rearward movement of the automobile, means making inoperative the first-mentioned means when said transmission is in reverse position, and means engageable with one of the driven parts restoring to operation said first-mentioned means when said drive shaft rotates in a forward direction.

22. In an automobile having a drive shaft and equipped with brakes and a means for applying the brakes, the combination of means acting automatically upon bringing the automobile to rest through application of the brakes to maintain said brakes applied against movement of the automobile in either direction, and means acting to automatically release said brakes upon forward rotation of said drive shaft.

23. In an automobile having a drive shaft and equipped with brakes and a means for applying the brakes, the combination of means acting automatically upon bringing the automobile to rest through application of the brakes to maintain said brakes applied against movement of the automobile in either direction, means acting to automatically release said brakes upon forward rotation of said drive shaft, and additional means controllable by the operator for releasing said brakes.

24. In an automobile having a transmission with forward and reverse positions, having a drive shaft, and being equipped with brakes, the combination of means for preventing release of the brakes after having been applied, a ratchet wheel, pawls engageable with said ratchet wheel, a pawl carrier rotated by said drive shaft, whereby said pawls are stationary and can resist turning of said ratchet wheel by engagement therewith only when said automobile is at rest, means making inoperative said first-mentioned means, means for rotating said ratchet wheel under said pawls and for withdrawing from operation said second-mentioned means upon application of said brakes, whereby said brakes are prevented from release only when said automobile is at rest, and means restoring to operation said second-mentioned means and thereby releasing said brakes upon shifting said transmission into reverse position.

25. In an automobile having a drive shaft, the combination of a ratchet, pawls engageable with said ratchet, a carrier for said pawls moved by said drive shaft, said pawls cooperating with said ratchet to move said ratchet upon unauthorized rearward movement of said automobile, means in connection with said ratchet acting upon movement of said ratchet to prevent rearward movement of said automobile, and means adapted upon authorizing rearward movement of the automobile to disconnect said first-mentioned means from said ratchet.

26. In an automobile having a drive shaft, the combination of a ratchet, pawls engageable with said ratchet, a carrier for said pawls moved by said drive shaft, said pawls cooperating with said ratchet to move said ratchet upon unauthorized rearward movement of said automobile, means in connection with said ratchet acting upon movement of said ratchet to prevent rearward movement of said automobile, and means adapted upon authorizing rearward movement of the automobile to first disconnect said first-mentioned means from said ratchet and then to disengage said pawls from said ratchet.

27. In an automobile equipped with a transmission having forward and reverse positions, and having a drive shaft, the combination of a ratchet wheel, pawls engageable with said ratchet wheel during slow speed of the automobile and when it is at rest, a carrier for said pawls rotated by said drive shaft, said pawls cooperating with said ratchet wheel to turn said ratchet wheel upon unauthorized rearward movement of said automobile, means acting upon the turning of said ratchet wheel to prevent rearward movement of said automobile and including a member in driving connection with said ratchet wheel, a second member wedged between said first member and a stationary portion of said automobile in such manner as to hold said first member in driving connection with said ratchet, and means adapted upon shifting said transmission into reverse to unwedge said second member, whereby said first member is released from driving connection with said ratchet wheel.

28. In an automobile equipped with a transmission having forward and reverse positions, and having a drive shaft, the combination of a stationary sleeve on said drive shaft, a ratchet wheel rotatably mounted on said sleeve, a pawl carrier attached to said drive shaft, pawls pivoting on said pawl carrier and engageable with said ratchet wheel to rotate said ratchet wheel upon unauthorized rearward movement of the automobile, said pawls, however, being adapted to disengage from said ratchet wheel by reason of centrifugal force when said drive shaft is in rapid rotation, a series of angularly shaped projections on a face of said ratchet wheel, means acting upon the rotation of said ratchet wheel to prevent rearward movement of said automobile and including a ring rotatably and slidably mounted on said sleeve adjacent said ratchet wheel, said ring having a series of angularly shaped projections on the face thereof corresponding to and adapted to engage the projections on said ratchet wheel to provide rotative connection between said ratchet wheel and said ring, a stationary member having a projecting portion terminating in a ramp, a second ring mounted rotatably and slidably on said sleeve between said stationary member and said first ring and having on its face a projecting portion terminating in a ramp, said projecting portion of said second ring being adapted to engage said projecting portion of said stationary member to hold said first ring in rotative connection with said ratchet wheel, and means controlling rotation of said second ring and adapted upon shifting said transmission into reverse position to rotate the projecting portion of said second ring out of engagement with the projecting portion of said stationary member, whereby said first ring is released from rotative connection with said ratchet wheel.

29. In an automobile equipped with a transmission having forward and reverse positions, and having a drive shaft, the combination of a ratchet, a pawl carrier moved by said drive shaft, pawls on said pawl carrier engageable with said ratchet during slow speed of the automobile and when it is at rest, said pawls cooperating with said ratchet to move said ratchet upon unauthorized rearward movement of the automobile, means controlled by the movement of said ratchet for preventing rearward movement of the automobile, means adapted upon shifting the transmission into reverse to disengage said pawls from said ratchet and hold them disengaged while the transmission is in reverse, and means withdrawing from operation said disengaging means upon forward rotation of said drive shaft.

30. In an automobile equipped with a transmission having forward and reverse positions, and having a drive shaft, the combination of a ratchet wheel, pawls engageable with said ratchet wheel during slow speed of the automobile and when it is at rest, a carrier for said pawls rotated by said drive shaft, said pawls cooperating with said ratchet wheel to rotate said ratchet wheel upon unauthorized rearward movement of the automobile, means controlled by rotation of said ratchet wheel for preventing rearward movement of the automobile, a member carrying projecting pins adapted to encounter said pawls and disengage said pawls from said ratchet wheel when said member is moved toward said pawl carrier, means for moving said member toward said pawl carrier to disengage said pawls when the transmission is shifted into reverse position, and means for withdrawing said pins from contact with said pawls upon forward rotation of said drive shaft.

31. In an automobile equipped with a transmission having forward and reverse positions, and having a drive shaft, the combination of a ratchet wheel, a pawl carrier rotated by said drive shaft, pawls on said pawl carrier engageable with said ratchet wheel during slow speed of the automobile and when it is at rest, said pawls cooperating with said ratchet wheel to rotate said ratchet wheel upon unauthorized rearward movement of the automobile, means controlled by rotation of said ratchet wheel for preventing rearward movement of the automobile, a disc carrying projecting members adapted to encounter said pawls and disengage said pawls from said ratchet wheel when said disc is moved toward said pawl carrier, means for moving said disc toward said pawl carrier to disengage said pawls when the transmission is shifted into reverse, buttress-shaped threads on the periphery of said disc, a stationary pawl adapted to engage said threads and screw said projecting members out of contact with said pawls upon forward rotation of said drive shaft but to ride over said threads without translation of said disc upon reverse rotation of the drive shaft, and means for moving said stationary pawl out of possible contact with said disc.

32. In an automobile equipped with brakes and a means for application of the brakes, and having a drive shaft, the combination of a ratchet, pawls engageable with said ratchet when the automobile is at rest, a carrier for said pawls moved by said drive shaft, said pawls cooperating with said ratchet to move said ratchet from its normal position upon unauthorized rearward movement of the automobile, means controlled by movement of said ratchet for preventing rearward movement of the automobile, means for moving said ratchet under said pawls upon application of the brakes, means preventing the brakes from releasing after having been applied, and means adapted upon return of said ratchet to its normal position to render inoperative said last-mentioned means.

33. In an automobile having a drive shaft and equipped with brakes, the combination of a ratchet, pawls engageable with said ratchet when the automobile is at rest, a carrier for said pawls moved by said drive shaft, a movable member in driving connection with said ratchet, means for moving said ratchet under said pawls upon application of said brakes, whereby said movable member is moved away from its normal position, a fluid-containing system adapted to move fluid therein upon application of said brakes, a check valve in said system preventing return of said fluid after application of said brakes, whereby said brakes are prevented from releasing, and means for opening said check valve to release said brakes upon return of said movable member to normal position.

34. In an automobile having a drive shaft and equipped with brakes, the combination of a member movable from normal position upon application of said brakes, means associated with said drive shaft for preventing return of said member to normal position when said drive shaft is not in rotation, a fluid-containing system adapted to move fluid therein upon application of said brakes, a check valve in said system preventing return of said fluid after application of said brakes, whereby said brakes are prevented from releasing, and means for opening said check valve to release said brakes upon return of said movable member to normal position.

CHARLES M. JAMESON.